US009838680B2

United States Patent
Deng et al.

(10) Patent No.: US 9,838,680 B2
(45) Date of Patent: Dec. 5, 2017

(54) METHOD AND APPARATUS FOR MEASURING QUALITY OF EXPERIENCE OF MOBILE VIDEO SERVICE

(71) Applicant: Huawei Technologies Co., Ltd., Shenzhen (CN)

(72) Inventors: Xiaolin Deng, Beijing (CN); Guanglin Han, Beijing (CN); Zesong Fei, Beijing (CN); Wei Bai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/185,231

(22) Filed: Jun. 17, 2016

(65) Prior Publication Data

US 2016/0295210 A1 Oct. 6, 2016

Related U.S. Application Data

(63) Continuation of application No. PCT/CN2013/089975, filed on Dec. 19, 2013.

(51) Int. Cl.
*H04N 17/00* (2006.01)
*H04L 29/06* (2006.01)

(52) U.S. Cl.
CPC .......... *H04N 17/004* (2013.01); *H04L 65/80* (2013.01)

(58) Field of Classification Search
CPC ... H04L 65/80; H04L 65/605; H04L 65/4069; H04L 65/602; H04L 65/4084; H04N 17/004; H04N 17/00
See application file for complete search history.

(56) References Cited

U.S. PATENT DOCUMENTS 9,037,743 B2 * 5/2015 Kordasiewicz ......... H04L 65/80
709/231
2003/0112333 A1 6/2003 Chen et al.
(Continued)

FOREIGN PATENT DOCUMENTS

CN 101895788 A 11/2010
CN 101984665 A 3/2011
(Continued)

OTHER PUBLICATIONS

Partial English Translation and Abstract of Chinese Patent Application No. CN102868907, Jan. 9, 2013, 21 pages.
(Continued)

*Primary Examiner* — Paulos M Natnael
*Assistant Examiner* — Sean Haiem
(74) *Attorney, Agent, or Firm* — Conley Rose, P.C.

(57) ABSTRACT

The method includes: processing a PSNR of each segment of each sample video, determining an ePSNR predictive model according to preset parameters obtained after processing and mean opinion scores of all sample videos, and determining an enhanced mean opinion score eMOS predictive model according to the predictive model. Then, for any video that needs to be evaluated, QoE of the video that needs to be evaluated may be determined according to only the enhanced MOS predictive model and an ePSNR determined according to the ePSNR predictive model. In comparison with a prior-art method for determining QoE in which only a mean value of PERNs of all frames is considered, in this process of measuring quality of experience of a mobile video service, as many as factors that affect a PSNR of a video are considered. Therefore, accurate measurement of quality of experience of an HAS video service can be implemented.

12 Claims, 6 Drawing Sheets

(56) References Cited

U.S. PATENT DOCUMENTS

| | | | | |
|---|---|---|---|---|
| 2006/0268980 | A1* | 11/2006 | Le Dinh | H04N 17/004 375/240.01 |
| 2008/0232459 | A1* | 9/2008 | Auyeung | H04N 19/147 375/240.01 |
| 2011/0211650 | A1* | 9/2011 | Thakolsri | H04N 21/234309 375/295 |
| 2012/0155398 | A1* | 6/2012 | Oyman | H04L 47/26 370/329 |
| 2014/0201382 | A1* | 7/2014 | Shivadas | H04L 65/605 709/231 |
| 2014/0269936 | A1* | 9/2014 | Shivadas | H04N 19/46 375/240.26 |
| 2014/0317234 | A1* | 10/2014 | Mueller | H04L 47/10 709/217 |

FOREIGN PATENT DOCUMENTS

| | | |
|---|---|---|
| CN | 102186098 A | 9/2011 |
| CN | 102202227 A | 9/2011 |
| CN | 102630037 A | 8/2012 |
| CN | 102710586 A | 10/2012 |
| CN | 102868907 A | 1/2013 |
| WO | 2013090280 A2 | 6/2013 |

OTHER PUBLICATIONS

Partial English Translation and Abstract of Chinese Patent Application No. CN102202227, Sep. 28, 2011, 17 pages.

Keimel, C., et al., "Improving the Prediction Accuracy of Video Quality Metrics," International Conference on Acoustics Speech and Signal Processing, Mar. 14, 2010, pp. 2442-2445.

Foreign Communication From a Counterpart Application, Chinese Application No. 201380003095.6, Chinese Office Action dated May 23, 2016, 7 pages.

Foreign Communication From a Counterpart Application, European Application No. 13899566.7, Extended European Search Report dated Jul. 29, 2016, 9 pages.

Foreign Communication From a Counterpart Application, PCT Application No. PCT/CN2013/089975, English Translation of International Search Report dated Sep. 24, 2014, 2 pages.

Foreign Communication From a Counterpart Application, PCT Application No. PCT/CN2013/089975, English Translation of Written Opinion dated Sep. 24, 2014, 7 pages.

* cited by examiner

Pre-process a peak signal to noise ratio PSNR of each segment of a sample video at each bit rate to obtain a differential peak signal to noise ratio dPSNR, where the dPSNR of each segment at each bit rate is a difference between a PSNR of the segment at the bit rate and a PSNR of the segment corresponding to a maximum bit rate in the same sample video ⟶ 101

Determine, for the same sample video according to the dPSNR of each segment at each bit rate, a preset parameter that is of a received video and is obtained according to the sample video, where the preset parameter includes a mean differential peak signal to noise ratio mean (dPSNR), a maximum differential peak signal to noise ratio max (dPSNR), a minimum differential peak signal to noise ratio min (dPSNR), and a variance differential peak signal to noise ratio std (dPSNR) ⟶ 102

Determine an enhanced peak signal to noise ratio ePSNR predictive model according to preset parameters of received videos and corresponding mean opinion scores MOSs, where the preset parameters of received videos are obtained according to all sample videos ⟶ 103

Determine an enhanced mean opinion score MOS predictive model according to the ePSNR predictive model ⟶ 104

FIG. 1

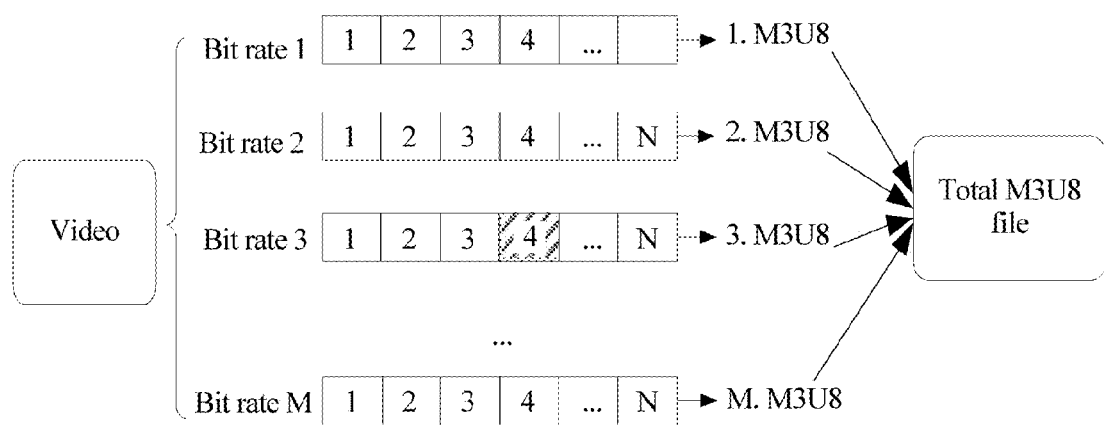

FIG. 2

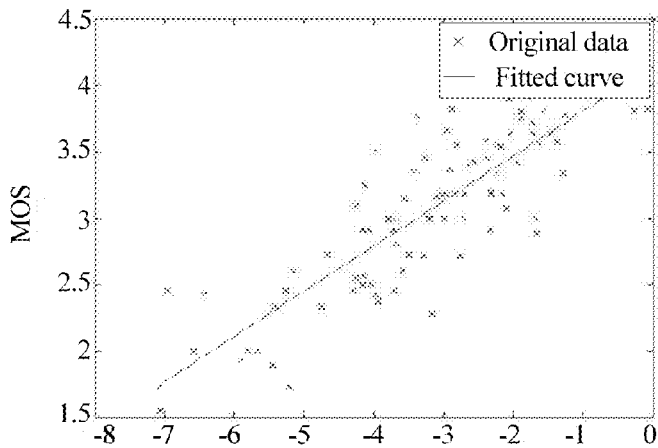

FIG. 8

Pre-process a structural similarity index measurement SSIM of each segment of a sample video at each bit rate to obtain a differential structural similarity index measurement dSSIM, where the dSSIM of each segment at each bit rate is a difference between an SSIM of the segment at the bit rate and an SSIM of the segment corresponding to a maximum bit rate in the same sample video  ⌒ 201

Determine, for the same received sample video according to the dSSIM of each segment at each bit rate, a preset parameter that is of a received video and is obtained according to the sample video, where the preset parameter includes a mean differential structural similarity index measurement mean (dSSIM), a maximum differential structural similarity index measurement max (dSSIM), a minimum differential structural similarity index measurement min (dSSIM), and a variance differential structural similarity index measurement std (dSSIM)  ⌒ 202

Determine an enhanced structural similarity index measurement eSSIM predictive model according to preset parameters of received videos and corresponding mean opinion scores MOSs, where the preset parameters of received videos are obtained according to all sample videos  ⌒ 203

Determine an enhanced mean opinion score MOS predictive model according to the eSSIM predictive model  ⌒ 204

FIG. 9

METHOD AND APPARATUS FOR MEASURING QUALITY OF EXPERIENCE OF MOBILE VIDEO SERVICE

CROSS-REFERENCE TO RELATED APPLICATIONS

This application is a continuation application of international application number PCT/CN2013/089975 filed on Dec. 19, 2013, which is incorporated by reference.

TECHNICAL FIELD

Embodiments of the present disclosure relate to the field of mobile communications, and in particular, to a method and an apparatus for measuring quality of experience (QoE) of a mobile video service.

BACKGROUND

With development of mobile Internet, a mobile video service represented by a mobile television (TV), a mobile video TV, or a video Short Message Service (SMS) message is increasingly popular with users, and the mobile video service is becoming a major force of a mobile communications service. To attract more clients, network providers and service providers are more concerned about QoE of a user on a mobile video service, where the QoE is reflected by a mean opinion score (MOS), a larger MOS value indicates better QoE and better user satisfaction. The MOS is a mean score of a video that is obtained by scoring the video by human. The scoring test needs to be implemented in a strict test environment by following a particular procedure specified by a standard, imposes a very high requirement on the environment, and has a complex procedure. Therefore, the scoring test is generally not used.

In some approaches, a MOS is evaluated by using a peak signal-to-noise ratio (PSNR) or a structural similarity index measurement (SSIM). Specifically, for a traditional video service, that is, a video service at a constant bit rate, a PSNR or an SSIM of each frame of a video is calculated, and then a mean value of PSNRs or SSIMs of all frames of the whole video is calculated. The mean value is used as an objective evaluation index of video quality.

However, for a Hypertext Transfer Protocol adaptive streaming (HAS) video service, a complete video is encoded at a transmit end into several videos at different bit rates, and segmentation is performed on a video at each bit rate. A receive end requests a segment at a corresponding bit rate according to a current channel condition, and therefore a bit rate is fluctuant when an HAS video is played. In this case, a MOS not only relates to a mean PSNR or a mean SSIM, but also relates to a fluctuation status of a bit rate. Therefore, the foregoing MOS evaluation method is not applicable to measurement of QoE of the HAS video service.

SUMMARY

Embodiments of the present disclosure provide a method and an apparatus for measuring QoE of a mobile video service, to implement accurate measurement of QoE of an HAS video service.

According to a first aspect, an embodiment of the present disclosure provides a method for measuring QoE of a mobile video service, including: pre-processing a PSNR of each segment of a sample video at each bit rate to obtain a differential PSNR (dPSNR), where the dPSNR of each segment at each bit rate is a difference between a PSNR of the segment at the bit rate and a PSNR of the segment corresponding to a maximum bit rate in the same sample video; determining, for the same sample video according to the dPSNR of each segment at each bit rate, a preset parameter that is of a received video and is obtained according to the sample video, where the preset parameter includes a mean dPSNR, a maximum dPSNR, a minimum dPSNR, and a variance std dPSNR; determining an enhanced PSNR (ePSNR) predictive model according to preset parameters of received videos and corresponding MOSs, where the preset parameters of received videos are obtained according to all sample videos; and determining an enhanced MOS (eMOS) predictive model according to the ePSNR predictive model.

In a first possible implementation manner of the first aspect, the determining an ePSNR predictive model according to preset parameters of received videos and corresponding MOSs, where the preset parameters of obtained videos are obtained according to all sample videos and corresponding MOSs includes: performing linear fitting on the preset parameters of all the sample videos and the corresponding MOSs once to determine an ePSNR, where ePSNR=a×mean (dPSNR)+b×max (dPSNR)+c×min (dPSNR)+d×std (dPSNR), and a, b, c, and d are a group of parameters that enable correlation between the ePSNR and the MOS to be the largest; and the determining an eMOS predictive model according to the ePSNR predictive model includes: performing linear fitting on the ePSNR determined according to the ePSNR predictive model, and a corresponding MOS once to determine an eMOS, where eMOS=e×ePSNR+f.

With reference to the first possible implementation manner of the first aspect, in a second possible implementation manner of the first aspect, a=1.3, b=0, c=−0.2, d=−0.6, e=0.34, and f=4.1.

According to a second aspect, an embodiment of the present disclosure provides a method for measuring QoE of a mobile video service, including: pre-processing a SSIM of each segment of a sample video at each bit rate to obtain a differential SSIM (dSSIM), where the dSSIM of each segment at each bit rate is a difference between an SSIM of the segment at the bit rate and an SSIM of the segment corresponding to a maximum bit rate in the same sample video; determining, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM; determining an enhanced SSIM (eSSIM) predictive model according to preset parameters of received videos and corresponding MOSs, where the preset parameters of received videos are obtained according to all sample videos; and determining an eMOS predictive model according to the eSSIM predictive model.

In a first possible implementation manner of the second aspect, the determining an eSSIM predictive model according to preset parameters of received videos and corresponding MOSs, where the preset parameters of obtained videos are obtained according to all sample videos and corresponding MOSs includes: performing linear fitting on the preset parameters of all the sample videos and the corresponding MOSs once to determine an eSSIM, where eSSIM=a×mean (dSSIM)+b×max (dSSIM)+c×min (dSSIM)+d×std (dSSIM), and a, b, c, and d are a group of parameters that enable correlation between the eSSIM and the MOS to be the largest; and the determining an eMOS predictive model according to the eSSIM predictive model includes: performing linear fitting on the eSSIM determined by the eSSIM predictive model, and a corresponding MOS once to determine an eMOS, where eMOS=e×eSSIM+f.

With reference to the first possible implementation manner of the second aspect, in a second possible implementation manner of the second aspect, a=1.4, b=0, c=−0.3, d=−0.9, e=22, and f=3.7.

According to a third aspect, an embodiment of the present disclosure provides an apparatus for measuring QoE of a mobile video service, including: a pre-processing module configured to pre-process a PSNR of each segment of a sample video at each bit rate to obtain a dPSNR, where the dPSNR of each segment at each bit rate is a difference between a PSNR of the segment at the bit rate and a PSNR of the segment corresponding to a maximum bit rate in the same sample video; a preset parameter determining module configured to determine, according to the dPSNR that is of each segment at each bit rate and is obtained by processing by the pre-processing module, a preset parameter that is of a received video and is obtained according to the sample video, where the preset parameter includes a mean dPSNR, a maximum dPSNR, a minimum dPSNR, and a variance dPSNR; an ePSNR predictive model determining module configured to determine an ePSNR predictive model according to preset parameters of received videos and corresponding MOSs, where the preset parameters of received videos are obtained according to all sample videos; and a MOS predictive model determining module configured to determine an eMOS predictive model according to the ePSNR predictive model determined by the ePSNR predictive model determining module.

In a first possible implementation manner of the third aspect, the ePSNR predictive model determining module is configured to perform linear fitting on the preset parameters of all the sample videos and the corresponding MOSs once to determine an ePSNR, where ePSNR=a×mean (dPSNR)+b×max (dPSNR)+c×min (dPSNR)+d×std (dPSNR), and a, b, c, and d are a group of parameters that enable correlation between the ePSNR and the MOS to be the largest; and the MOS predictive model determining module is configured to perform linear fitting on the ePSNR determined according to the ePSNR predictive model, and a corresponding MOS once to determine an eMOS, where eMOS=e×ePSNR+f.

With reference to the first possible implementation manner of the third aspect, in a second possible implementation manner of the third aspect, a=1.3, b=0, c=−0.2, d=−0.6, e=0.34, and f=4.1.

According to a fourth aspect, an embodiment of the present disclosure provides an apparatus for measuring QoE of a mobile video service, including: a pre-processing module configured to pre-process a SSIM of each segment of a sample video at each bit rate to obtain a dSSIM, where the dSSIM of each segment at each bit rate is a difference between an SSIM of the segment at the bit rate and an SSIM of the segment corresponding to a maximum bit rate in the same sample video; a preset parameter determining module configured to determine, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM; an eSSIM predictive model determining module configured to determine an eSSIM predictive model according to preset parameters of received videos and corresponding MOSs, where the preset parameters of received videos are obtained according to all sample videos; and a MOS predictive model configured to determine an eMOS predictive model according to the eSSIM predictive model determined by the eSSIM predictive model determining module.

In a first possible implementation manner of the fourth aspect, the eSSIM predictive model determining module is configured to perform linear fitting on the preset parameters of all the sample videos and the corresponding MOSs once to determine an eSSIM, where eSSIM=a×mean dSSIM+b×max dSSIM+c×min dSSIM+d×std dSSIM, and a, b, c, and d are a group of parameters that enable correlation between the eSSIM and the MOS to be the largest; and the MOS predictive model determining module is specifically configured to perform linear fitting on the eSSIM determined by the eSSIM predictive model, and a corresponding MOS once to determine an eMOS, where eMOS=e×eSSIM+f.

With reference to the first possible implementation manner of the fourth aspect, in a second possible implementation manner of the fourth aspect, a=1.4, b=0, c=−0.3, d=−0.9, e=22, and f=3.7.

According to a fifth aspect, an embodiment of the present disclosure provides an apparatus for measuring QoE of a mobile video service, including: a processor and a memory, where the memory stores an execution instruction; when the apparatus for measuring QoE of a mobile video service runs, the processor communicates with the memory, and the processor executes the execution instruction to: pre-process a PSNR of each segment of a sample video at each bit rate to obtain a dPSNR, where the dPSNR of each segment at each bit rate is a difference between a PSNR of the segment at the bit rate and a PSNR of the segment corresponding to a maximum bit rate in the same sample video; determine, for the same sample video according to the dPSNR of each segment at each bit rate, a preset parameter that is of a received video and is obtained according to the sample video, where the preset parameter includes a mean dPSNR, a maximum dPSNR, a minimum dPSNR, and a variance dPSNR; determine an ePSNR predictive model according to preset parameters of received videos and corresponding MOSs, where the preset parameters of received videos are obtained according to all sample videos; and determine an eMOS predictive model according to the ePSNR predictive model.

In a first possible implementation manner of the fifth aspect, the processor is further configured to execute the execution instruction to perform linear fitting on the preset parameters of all the sample videos and the corresponding MOSs once to determine an ePSNR, where ePSNR=a×mean dPSNR+b×max dPSNR+c×min dPSNR+d×std dPSNR, and a, b, c, and d are a group of parameters that enable correlation between the ePSNR and the MOS to be the largest; and perform linear fitting on the ePSNR determined according to the ePSNR predictive model, and a corresponding MOS once to determine an eMOS, where eMOS=e×ePSNR+f.

With reference to the first possible implementation manner of the fifth aspect, in a second possible implementation manner of the fifth aspect, a=1.3, b=0, c=−0.2, d=−0.6, e=0.34, and f=4.1.

According to a sixth aspect, an embodiment of the present disclosure provides an apparatus for measuring QoE of a mobile video service, including: a processor and a memory, where the memory stores an execution instruction; when the apparatus for measuring QoE of a mobile video service runs, the processor communicates with the memory, and the processor executes the execution instruction to: pre-process a SSIM of each segment of a sample video at each bit rate to obtain a dSSIM, where the dSSIM of each segment at each bit rate is a difference between an SSIM of the segment at the bit rate and an SSIM of the segment corresponding to a maximum bit rate in the same sample video; determine, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM; determine an eSSIM predictive model according to preset parameters of received videos and corresponding MOSs, where the preset parameters of received videos are obtained according to all sample videos; and determine an eMOS predictive model according to the eSSIM predictive model.

In a first possible implementation manner of the sixth aspect, the processor is further configured to execute the execution instruction to perform linear fitting on the preset parameters of all the sample videos and the corresponding MOSs once to determine an eSSIM, where eSSIM=a×mean dSSIM+b×max dSSIM+c×min dSSIM+d×std dSSIM, and a, b, c, and d are a group of parameters that enable correlation between the eSSIM and the MOS to be the largest; and perform linear fitting on the eSSIM determined by the eSSIM predictive model, and a corresponding MOS once to determine an eMOS, where eMOS=e×eSSIM+f.

With reference to the first possible implementation manner of the sixth aspect, in a second possible implementation manner of the sixth aspect, a=1.4, b=0, c=−0.3, d=−0.9, e=22, and f=3.7.

According to the method and the apparatus for measuring QoE of a mobile video service according to the embodiments of the present disclosure, after a PSNR of each segment of each sample video is processed, an ePSNR predictive model is determined according to preset parameters obtained after processing and MOSs of all sample videos, and then an eMOS predictive model is determined according to the predictive model. Then, for any video that needs to be evaluated, QoE of the video that needs to be evaluated may be determined according to only the eMOS predictive model and an ePSNR determined according to the ePSNR predictive model. In comparison with a prior-art method for determining QoE in which only a mean value of PERNs of all frames is considered, in this process of measuring QoE of a mobile video service, as many as factors that affect a PSNR of a video are considered. Therefore, accurate measurement of QoE of an HAS video service can be implemented.

BRIEF DESCRIPTION OF DRAWINGS

FIG. 1 is a flowchart of Embodiment 1 of a method for measuring QoE of a mobile video service according to the present disclosure;

FIG. 2 is a schematic structural diagram of a video according to the present disclosure;

FIG. 8 is a schematic diagram of an actual MOS score and a fitted curve;

FIG. 9 is a flowchart of Embodiment 2 of a method for measuring QoE of a mobile video service according to the present disclosure;

DESCRIPTION OF EMBODIMENTS

Figure 3:
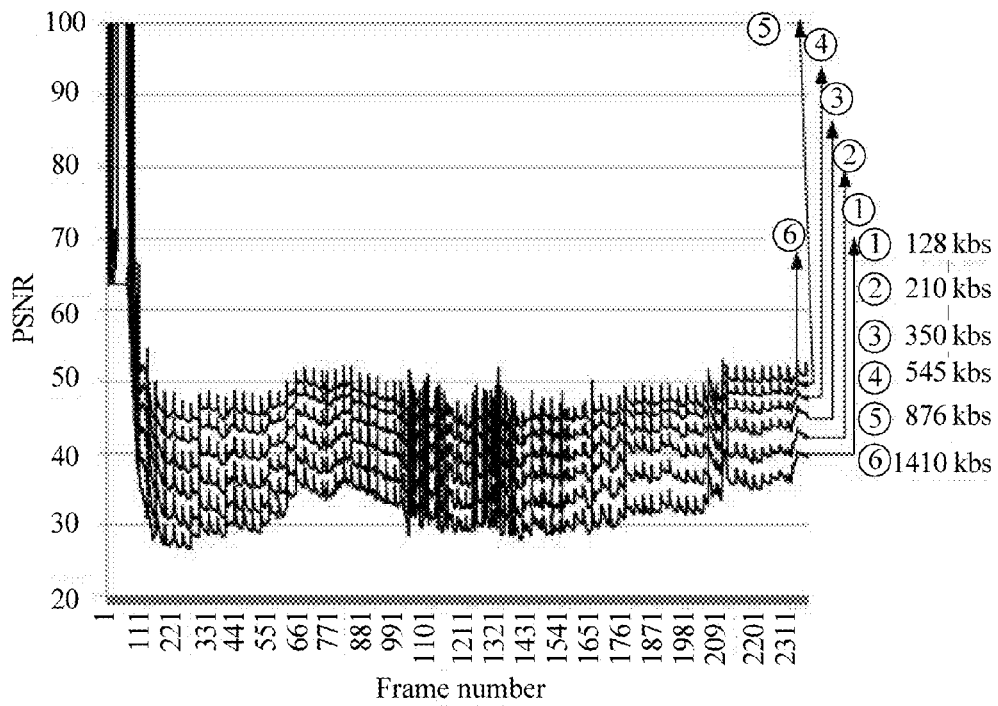
FIG. 3 is a schematic diagram of PSNR distribution of a video according to the present disclosure.

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

FIG. 1 is a flowchart of Embodiment 1 of a method for measuring QoE of a mobile video service according to the present disclosure. This embodiment is executed by an apparatus for measuring QoE, where the apparatus for measuring QoE may be independently arranged on a radio access network side, or may be integrated with a network element on a radio access network side. If the apparatus is integrated with an evolved NodeB (eNodeB, eNB), this embodiment is applicable to a scenario in which QoE of a video service at inconstant bit rates needs to be accurately measured. Specifically, this embodiment includes the following steps:

101. Pre-process a PSNR of each segment of a sample video at each bit rate to obtain a dPSNR, where the dPSNR of each segment at each bit rate is a difference between a PSNR of the segment at the bit rate and a PSNR of the segment corresponding to a maximum bit rate in the same sample video.

Generally, a video includes many frame images, and a PSNR and an SSIM are objective standards for evaluating image quality. The standards for objectively evaluating an image are applied to a video service, and a mean value of PSNRs or SSIMs of all frames is calculated to obtain a mean PSNR or a mean SSIM, so that evaluation for QoE of a traditional video service is implemented, where the traditional video is a video in which bit rates of all frames are consistent. In this embodiment, the video is mainly a video at inconstant bit rates, such as an HAS video. For an HAS video service, a complete video is encoded into several videos at different bit rates, and segmentation is performed on a video at each bit rate. A receive end requests video segment at a corresponding bit rate is requested according to a current channel condition. From a perspective of a bit rate, at a same frame number, a PSNR value of a video at a large bit rate is always greater than a PSNR value of a video at a small bit rate. From a perspective of each segment, a fluctuation phenomenon occurs in PSNR values of different segments at a same bit rate, that is, PSNR values at different frame numbers. For example, a PSNR value of a frame used for transmitting a static image is greater than a PSNR value of a frame used for transmitting a dynamic image. It can be learned that a PSNR of a video not only relates to a bit rate, but also relates to content of the video.

For the foregoing characteristics of the HAS video service, in this step, the apparatus for measuring QoE preprocesses the PSNR of each segment of the sample video, that is, for each segment at each bit rate, calculates the difference between the PSNR of the segment at the bit rate and the PSNR of the segment corresponding to the maximum bit rate in the same sample video. Specifically, reference may be made to FIG. 2.

FIG. 2 is a schematic structural diagram of a video according to the present disclosure. As shown in FIG. 2, a sample video is first encoded into M bit rates, and then each bit rate is divided into N segments; a video at each bit rate corresponds to one M3U8 file in which storage addresses, at a transmit end, of all segmented videos at the bit rate are recorded. Finally, M3U8 files corresponding to all bit rates form a total M3U8 file in which storage addresses of M3U8 files of all bit rates are recorded. When requesting a video to be played, a receive end first downloads the total M3U8 file, and then downloads, according to the total M3U8 file, the M3U8 files corresponding to all bit rates. When playing a video, the receive end determines, according to a current download status, a segment at a bit rate that should be requested for a next segment, and requests the corresponding segment from the transmit end according to an M3U8 file of the requested bit rate. For example, time used for downloading a current segment is relatively short, which indicates that a current channel condition is good, and when a next segment is to be downloaded, a segment at a larger bit rate than a current bit rate should be requested. By using this method, utilization of channel resources is maximized on a premise that a download speed matches a playing speed, so that a video with relatively high quality can be smoothly watched at the receive end.

Generally, quality of videos at different bit rates tends to be consistent with change of frame numbers, a dPSNR is obtained by subtracting a PSNR corresponding to a video at a largest bit rate from a PSNR of each segment at each bit rate, where the dPSNR may be calculated by using the following formula (1):

$$dPSNRij = PSNR_{ij} - PSNR_{Mj}, \quad (1)$$

where i=1, 2, 3, . . . , M indicates different bit rates, i=1 indicates a smallest bit rate, i=M indicates a largest bit rate, j=1, 2, 3, . . . , N indicates different segments, j=1 indicates the first segment in a video time direction, and j=N indicates the last segment. Because a video finally received by a receive end is a combination of segments at different bit rates, in comparison with an original video, a deviation exists, that is, video impairment occurs.

102. Determine, for the same sample video according to the dPSNR of each segment at each bit rate, a preset parameter that is of a received video and is obtained according to the sample video, where the preset parameter includes a mean dPSNR, a maximum dPSNR, a minimum dPSNR, and a variance dPSNR.

In this step, the apparatus for measuring QoE determines as many as PSNR factors that affect quality of the received video, and uses the PSNR factors as the preset parameter.

Specifically, the dPSNR of each segment at each bit rate may be calculated by a sender, and stored in an M3U8 file.

The receive end may determine the preset parameter according to the received video and the captured M3U8 file, for example, determine a mean dPSNR, a max dPSNR, a min dPSNR, a std dPSNR, and the like of all segments, and use the determined data as the preset parameter. The mean dPSNR is a most crucial factor that affects video quality; the min PSNR reflects a worst segment in quality in videos received by the receive end; the max PSNR reflects a best segment in the received videos, and a standard deviation value std PSNR reflects a fluctuation status of video quality, where a larger standard deviation indicates greater fluctuation of the video quality, and a smaller standard deviation indicates smaller fluctuation of the video quality.

103. Determine an ePSNR predictive model according to preset parameters of received videos and corresponding MOSs, where the preset parameters of received videos are obtained according to all sample videos.

The apparatus for measuring QoE uses the mean dPSNR as the most crucial factor that affects the QoE, and impact of other preset parameters, that is, the max dPSNR, the min dPSNR, and the std dPSNR, on the QoE is determined in sequence based on the mean dPSNR. A PSNR determined according to the preset parameters is referred to as an ePSNR in the following. The apparatus for measuring QoE performs fitting on all preset parameters and corresponding MOSs according to a preset algorithm, so as to determine the ePSNR predictive model.

104. Determine an eMOS predictive model according to the ePSNR predictive model.

After the ePSNR predictive model is determined, the apparatus for measuring QoE further performs fitting on the ePSNR predictive model and a corresponding MOS, so as to determine the eMOS predictive model.

In the method for measuring QoE of a mobile video service according to this embodiment of the present disclosure, after a PSNR of each segment of each sample video is processed, an ePSNR predictive model is determined according to preset parameters obtained after processing and MOSs of all sample videos, and then an eMOS predictive model is determined according to the predictive model. Then, for any video that needs to be evaluated, QoE of the video that needs to be evaluated may be determined according to only the eMOS predictive model and an ePSNR determined according to the ePSNR predictive model. In comparison with a prior-art method for determining QoE in which only a mean value of PERNs of all frames is considered, in this process of measuring QoE of a mobile video service, as many as factors that affect a PSNR of a video are considered. Therefore, accurate measurement of QoE of an HAS video service can be implemented.

The following uses a specific embodiment to describe in detail a process in which how an ePSNR predictive model and an eMOS predictive model are determined in the present disclosure. In this embodiment, Next Generation Mobile Networks (NGMN) provides 90 impaired videos as sample videos, and provides a playing history of each sample video, where the playing history carries information about videos at different bit rates respectively played at different time. For each sample video, a dPSNR of each segment of a video at each encode bit rate is known. Therefore, a mean dPSNR, a max dPSNR, a min dPSNR, and a std dPSNR may be easily calculated according to the playing history. In addition, a MOS score of each sample video is known.

FIG. 3 is a schematic diagram of PSNR distribution of a video according to the present disclosure. In this embodiment, a video includes videos at six bit rates, and curves (1) to (6) from bottom to top in the figure respectively represent different bit rates, where a bit rate of curve (1) is 128 kilobits per second (kbs), a bit rate of curve (2) is 210 kbs, a bit rate of curve (3) is 350 kbs, a bit rate of curve (4) is 545 kbs, a bit rate of curve (5) is 876 kbs, and a bit rate of curve (6) is 1410 kbs. A horizontal coordinate is a frame number, and a vertical coordinate is a PSNR value. It should be noted that, this figure is merely a schematic diagram, and does not represent a figure obtained according to actual experimental data.

With reference to FIG. 3, it can be obtained by means of reasoning from the figure that videos at different bit rates tend to be consistent with change of frame numbers. For example, at frame number 771, a difference between a PSNR value corresponding to curve (2) and a PSNR value corresponding to curve (6) is dPSNR1; at frame number 1431, a difference between a PSNR value corresponding to curve (2) and a PSNR value corresponding to curve (6) is dPSNR2; and dPSNR1 approximates to dPSNR2. Therefore, a dPSNR of a same segment of all curves are calculated, and a dPSNR of another segment is an approximate value of the dPSNR of the same segment.

According to the formula (1) in FIG. 2, a PSNR of a segment is processed, a result of obtained dPSNRs is shown in Table 1, and Table 1 is an attribute table of dPSNRs in FIG. 3.

TABLE 1

| Bit rate (kbs) | dPSNR |
|---|---|
| 128 | −6.33862 |
| 210 | −4.81513 |
| 350 | −3.63021 |
| 545 | −2.39006 |
| 876 | −1.22393 |
| 1410 | 0 |

After a dPSNR value is determined, preset parameters, that is, a mean dPSNR, a max dPSNR, a min dPSNR, a std dPSNR, and the like, of all segments of a received video are determined according to the value, then the mean dPSNR is used as a most crucial factor that affects QoE, and impact of other preset parameters, that is, the max dPSNR, the min dPSNR, and the std dPSNR on the QoE is determined in sequence based on the mean dPSNR.

Figure 4:
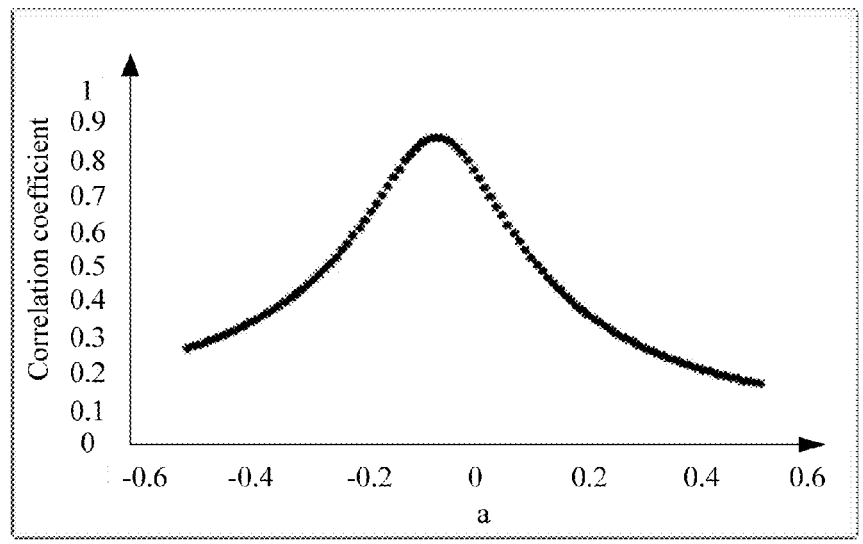
FIG. 4 is a first analysis diagram of correlation between a MOS and y.

First, impact of a worst segment in a sample video on a MOS score is analyzed, and an objective estimated value is set to y=mean dPSNR+a×min dPSNR, that is, a PSNR value of the worst segment in the video is introduced into an objective evaluation algorithm, where a value range of a is −0.5 to 0.5. FIG. 4 is a first analysis diagram of correlation between a MOS and y.

Referring to FIG. 4, a horizontal coordinate is a, and a vertical coordinate is a correlation coefficient. When a=0, and y=mean dPSNR, a correlation coefficient between the MOS and y is 0.7877, that is, a correlation coefficient between the MOS and the mean dPSNR is 0.7877. When a value of a varies, fluctuation of correlation between the MOS and y is relatively great, and when a is an appropriate value, correlation between the MOS and y may be greater than correlation between the MOS and mean dPSNR. It can be seen from the figure that, when a is approximately −0.05, that is, a coefficient before the min dPSNR is −0.05, correlation between the MOS and y can reach the largest and be obviously larger than correlation between the MOS and mean. Therefore, the min dPSNR is used as input in an improved objective evaluation algorithm, which may improve accuracy of a predictive algorithm.

Figure 5:
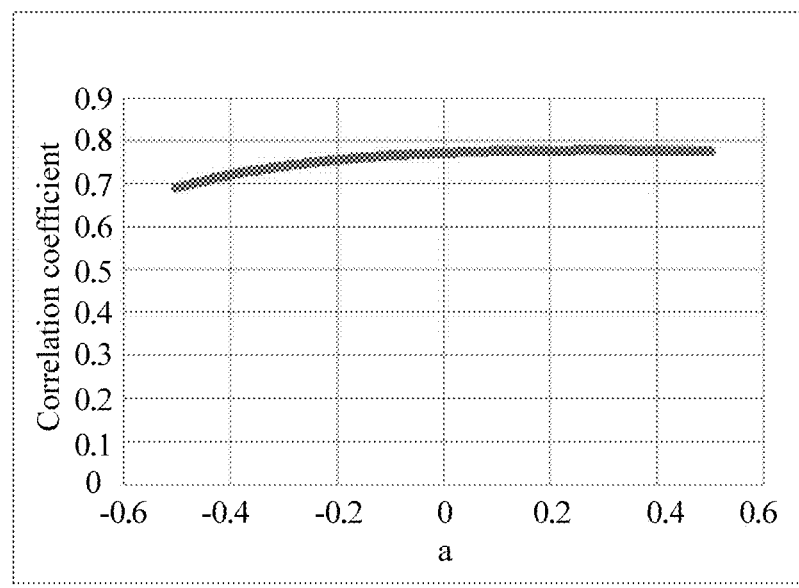
FIG. 5 is a second analysis diagram of correlation between a MOS and y.

Then, impact of a best segment in the sample video on a MOS is analyzed, and an objective estimated value is set to y=mean dPSNR+a×max dPSNR. As described above, a value range of a is −0.5 to 0.5, that is, a variation range of a coefficient before the max dPSNR is also −0.5 to 0.5. FIG. 5 is a second analysis diagram of correlation between a MOS and y.

Referring to FIG. 5, a horizontal coordinate is a, and a vertical coordinate is a correlation coefficient. With change of the coefficient a before the max dPSNR, fluctuation of correlation between the MOS and y is small, which indicates that the max dPSNR affects little on the MOS. Correlation between the MOS and y is approximately equal to correlation between the MOS score and mean. Therefore, in an improved objective evaluation algorithm, there is no need to use the max dPSNR as input.

Figure 6:
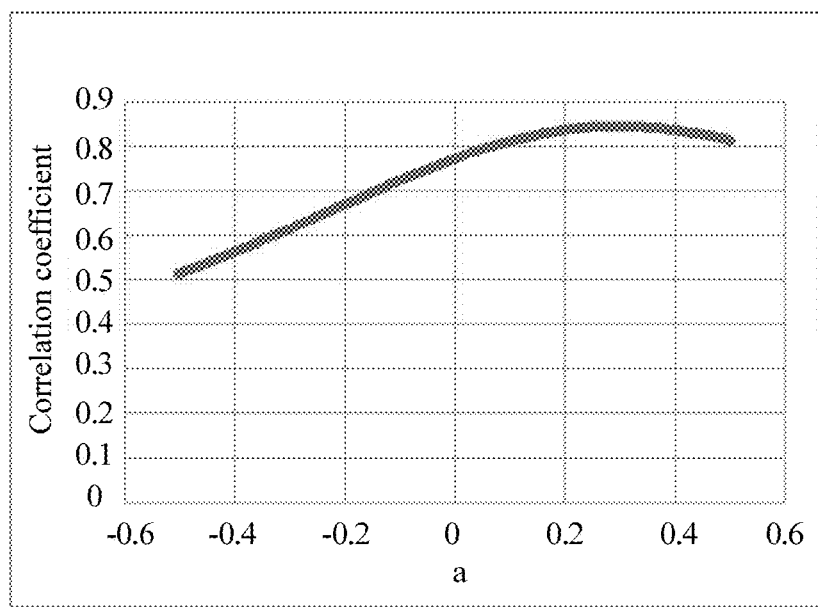
FIG. 6 is a third analysis diagram of correlation between a MOS e and y.

Finally, impact of a variance of dPSNRs of each segment of the sample video on a MOS is analyzed. An objective estimated value is set to y=mean dPSNR+a×std dPSNR, and a value range of a is −0.5 to 0.5, that is, a variation range of a coefficient before the std dPSNR is also −0.5 to 0.5. FIG. 6 is a third analysis diagram of correlation between a MOS and y.

Referring to FIG. 6, a horizontal coordinate is a, and a vertical coordinate is a correlation coefficient; with change of the coefficient of the std dPSNR, fluctuation of correlation between the MOS and y is relatively great, which indicates that the std dPSNR affects the MOS to some degree. When a is an appropriate value, that is, an appropriate coefficient is taken before the std dPSNR, correlation between the MOS and y is greater than correlation between the MOS score and the mean dPSNR. Therefore, the std dPSNR is added to an improved objective evaluation algorithm, which may improve performance of predicting a MOS by using the improved objective evaluation algorithm. Therefore, the std dPSNR can be used as input in the improved objective evaluation algorithm.

It can be concluded from the foregoing analysis that, a value of a MOS mainly depends on a mean value of dPSNRs, where a minimum value of the dPSNRs affects the MOS obviously, a variance of the dPSNRs affects the value of the MOS, and a maximum value of the dPSNRs affects little on the MOS. Therefore, a formula of an improved objective evaluation algorithm may be set as follows:

$$ePSNR = a \times \text{mean } dPSNR + \quad (2)$$
$$b \times \max dPSNR + c \times \min dPSNR + d \times \text{std } dPSNR.$$

After the ePSNR predictive model is determined, a value of the ePSNR and an existing MOS are fitted to obtain a MOS predictive model, where $$eMOS = e \times ePSNR + f. \quad (3)$$

In the foregoing formula (2), because the maximum value of the dPSNRs affects little on the MOS, b=0. Afterwards, iteration is performed by using a series of values, a coefficient of largest correlation between the MOS score and the ePSNR is a finally determined coefficient. Finally obtained results are a=1.3, b=−0.2, and c=−0.6. The coefficients are substituted into the formula (2) to obtain:

$$ePSNR = 1.3 \times \text{mean } dPSNR - 0.2 \times \min dPSNR - 0.6 \times \text{std } dPSNR. \quad (4)$$

Further, according to the formula (4), a value of the ePSNR and an existing MOS are fitted to obtain e=0.34 and f=4.1, and the coefficients are substituted into the formula (3) to obtain:

$$eMOS=0.34 \times eSSIM+4.1. \quad (5)$$

Figure 7A:
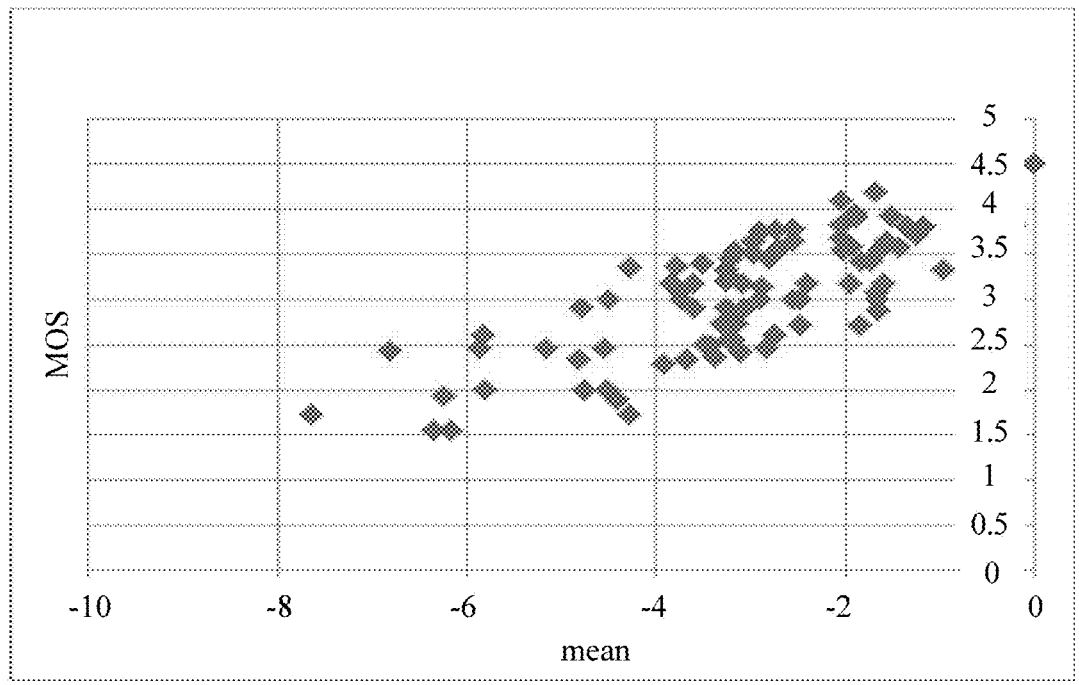
FIG. 7A is a scatter diagram of a MOS and a mean dPSNR.
Figure 7B:
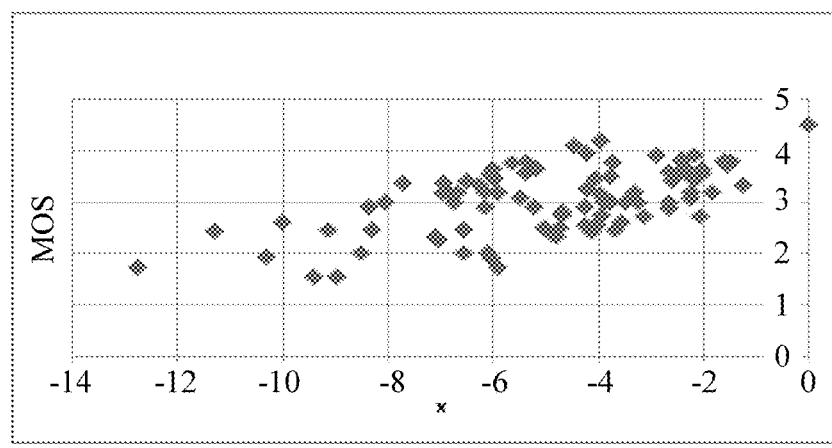
FIG. 7B is a scatter diagram of a MOS and an ePSNR.

FIG. 7A is a scatter diagram of a MOS and a mean dPSNR, and FIG. 7B is a scatter diagram of a MOS and an ePSNR.

Referring to FIG. 7A, a horizontal coordinate is a value of a mean dPSNR, and a vertical coordinate is a MOS; a coefficient 0.7713 of correlation between the MOS and the mean dPSNR is obtained by calculation.

Referring to FIG. 7B, a horizontal coordinate is a value of an ePSNR, and a vertical coordinate is a MOS; a coefficient 0.8716 of correlation between the MOS and the ePSNR is obtained by calculation.

Therefore, with reference to FIG. 7A and FIG. 7B, it can be learned that, performance of predicting a MOS value by using a mean value, a minimum value and a variance of dPSNRs is better than performance of predicting a MOS value by using a mean value of dPSNRs only.

FIG. 8 is a schematic diagram of an actual MOS score and a fitted curve, and it can be seen that actual MOS scores surround a fitted curve tightly.

In conclusion, in the method for measuring QoE of a mobile video service according to this embodiment of the present disclosure, as many as factors such as a mean value, a minimum value, and a variance of dPSNRs that affect a PSNR of a video are considered, and performance of predicting a MOS value obtained in this way is better than performance of predicting a MOS value by using a mean value of dPSNRs only. Therefore, after predictive models, that is, the foregoing formula (4) and formula (5) are determined, for any HAS video that needs to be evaluated, if a dPSNR of each segment of the video that needs to be evaluated is determined, and then a mean dPSNR, a min dPSNR, and a std dPSNR are determined, QoE may be accurately evaluated according to the formula (4) and formula (5).

FIG. 9 is a flowchart of Embodiment 2 of a method for measuring QoE of a mobile video service according to the present disclosure. In comparison with the processing a PSNR of each segment to determine a forecast model, in this embodiment, an SSIM of each segment is processed to determine a predictive model. Specifically, this embodiment includes the following steps:

201. Pre-process a SSIM of each segment of a sample video at each bit rate to obtain a dSSIM, where the dSSIM of each segment at each bit rate is a difference between an SSIM of the segment at the bit rate and an SSIM of the segment corresponding to a maximum bit rate in the same sample video.

In this step, an apparatus for measuring QoE pre-processes the SSIM of each segment of the sample video, that is, for each segment at each bit rate, calculates the difference between the SSIM of the segment at the bit rate and the SSIM of the segment corresponding to the maximum bit rate in the same sample video. For specific processing method, reference is made to the foregoing step 101 in FIG. 1, and details are not described herein.

202. Determine, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM.

In this step, the apparatus for measuring QoE determines as many as SSIM factors that affect the received video, and uses the SSIM factors as the preset parameter. For example, the apparatus for measuring QoE determines a mean dSSIM, a max dSSIM, a min dSSIM, a std dSSIM, and the like, of all segments, and uses the determined data as the preset parameter. The mean dSSIM is a most crucial factor that affects video quality; the min dSSIM reflects a worst segment in quality in the sample video; the max dSSIM reflects a best segment in the sample video; and a standard deviation value std dSSIM reflects a fluctuation status of the video quality, where a larger standard deviation indicates greater fluctuation of the video quality, and a smaller standard deviation indicates smaller fluctuation of the video quality.

203. Determine an eSSIM predictive model according to preset parameters of received videos and corresponding MOSs, where the preset parameters of received videos are obtained according to all sample videos.

The apparatus for measuring QoE uses the mean dSSIM as the most crucial factor that affects the QoE, and impact of other preset parameters, that is, the max dSSIM, the min dSSIM, and the std dSSIM on the QoE is determined in sequence based on the mean dSSIM. An SSIM determined according to the preset parameters is referred to as an eSSIM in the following. The apparatus for measuring QoE performs fitting on all preset parameters and corresponding MOSs according to a preset algorithm, so as to determine the eSSIM predictive model.

204. Determine an eMOS predictive model according to the eSSIM predictive model.

After the eSSIM predictive model is determined, the apparatus for measuring QoE further performs fitting on the eSSIM predictive model and a corresponding MOS, so as to determine the eMOS predictive model.

In the method for measuring QoE of a mobile video service according to this embodiment of the present disclosure, after an SSIM of each segment of each sample video is processed, an eSSIM predictive model is determined according to preset parameters obtained after processing and MOSs of all sample videos, and then an eMOS predictive model is determined according to the predictive model. Then, for any video that needs to be evaluated, QoE of the video that needs to be evaluated may be determined according to only the eMOS predictive model and an SSIM determined according to the eSSIM predictive model. In comparison with a prior-art method for determining QoE in which only a mean value of SSIMs of all frames is considered, in this process of measuring QoE of a mobile video service, as many as factors that affect an SSIM of a received video are considered. Therefore, accurate measurement of QoE of an HAS video service can be implemented.

Further, in the foregoing Embodiment 2, the apparatus for measuring QoE performs linear fitting on the preset parameters of all received sample videos and the corresponding MOSs once to determine an eSSIM, where $$eSSIM = \qquad (6)$$
$$a \times \text{mean } dSSIM + b \times \text{max } dSSIM + c \times \text{min } dSSIM + d \times \text{std } dSSIM.$$

After the eSSIM predictive model is determined, a value of the eSSIM and an existing MOS are fitted to obtain a MOS predictive model, where $$eMOS=e \times eSSIM+f. \qquad (7)$$

In the foregoing formula (6), a, b, c, and d are a group of parameters that enable correlation between the eSSIM and the MOS to be the largest, a=1.4, b=−0.3, and c=−0.9 are determined after iteration is performed by using a series of values, and the coefficients are substituted into the formula (6) to obtain:

$$eSSIM=1.4 \times \text{mean } dSSIM - 0.3 \times \text{min } dSSIM - 0.9 \times \text{std } (dSSIM). \quad (8)$$

Further, according to the formula (8), a value of the eSSIM and an existing MOS are fitted to obtain e=22 and f=3.7, and the coefficients are substituted into the formula (7) to obtain:

$$eMOS=22 \times eSSIM + 3.7. \quad (9)$$

After predictive models, that is, the foregoing formula (8) and formula (9) are determined, for any HAS video that needs to be evaluated, if a dSSIM of each segment of the video that needs to be evaluated is determined, and then a mean dSSIM, a min dSSIM, and a std dSSIM are determined, QoE may be accurately evaluated according to the formula (8) and formula (9).

It should be noted that, in the foregoing Embodiment 1, a PSNR of each segment is processed to determine a predictive model, and in the foregoing Embodiment 2, an SSIM of each segment is processed to determine a predictive model. Because a PSNR and an SSIM are two different parameters, although processes of determining a predictive model by using the two parameters are consistent, for a same HAS video that needs to be evaluated, QoE determined according to the two manners is similar, but a deviation exists.

Figure 10:
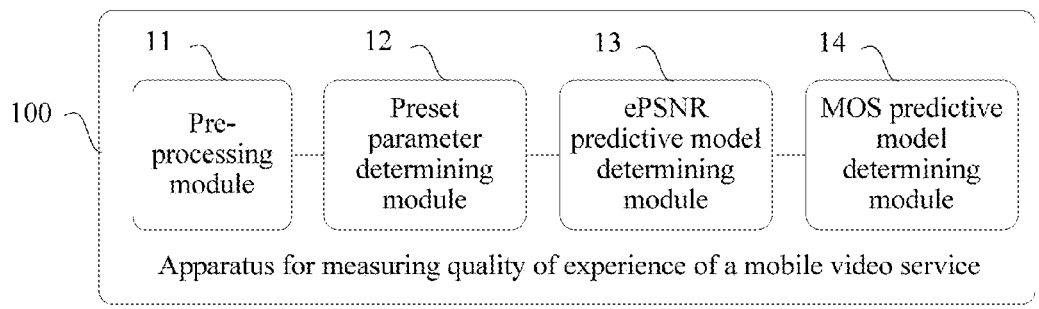
FIG. 10 is a schematic structural diagram of Embodiment 1 of an apparatus for measuring QoE of a mobile video service according to the present disclosure.

FIG. 10 is a schematic structural diagram of Embodiment 1 of an apparatus for measuring QoE of a mobile video service according to the present disclosure. The apparatus for measuring QoE of a mobile video service according to this embodiment is an apparatus embodiment corresponding to the embodiment in FIG. 1 of the present disclosure, and a specific implementation process is not described herein. Specifically, an apparatus 100 for measuring QoE of a mobile video service according to this embodiment includes: a pre-processing module 11 configured to pre-process a PSNR of each segment of a sample video at each bit rate to obtain a dPSNR, where the dPSNR of each segment at each bit rate is a difference between a PSNR of the segment at the bit rate and a PSNR of the segment corresponding to a maximum bit rate in the same sample video; a preset parameter determining module 12 configured to determine, according to the dPSNR that is of each segment at each bit rate and is obtained by processing by the pre-processing module 11, a preset parameter that is of a received video and is obtained according to the sample video, where the preset parameter includes a mean dPSNR, a maximum dPSNR, a minimum dPSNR, and a variance dPSNR; an ePSNR predictive model determining module 13 configured to determine an ePSNR predictive model according to preset parameters of received videos and corresponding MOSs, where the preset parameters of received videos are obtained according to all sample videos; and a MOS predictive model determining module 14 configured to determine an eMOS predictive model according to the ePSNR predictive model determined by the ePSNR predictive model determining module 13.

Further, the ePSNR predictive model determining module 13 is configured to perform linear fitting on the preset parameters of all the sample videos and the corresponding MOSs once to determine an ePSNR, where ePSNR=a×mean dPSNR+b×max dPSNR+c×min dPSNR+d×std dPSNR, and a, b, c, and d are a group of parameters that enable correlation between the ePSNR and the MOS to be the largest.

The MOS predictive model determining module 14 is configured to perform linear fitting on the ePSNR determined according to the ePSNR predictive model, and a corresponding MOS once to determine an eMOS, where eMOS=e×ePSNR+f.

Further, a=1.3, b=0, c=−0.2, d=−0.6, e=0.34, and f=4.1.

Figure 11:
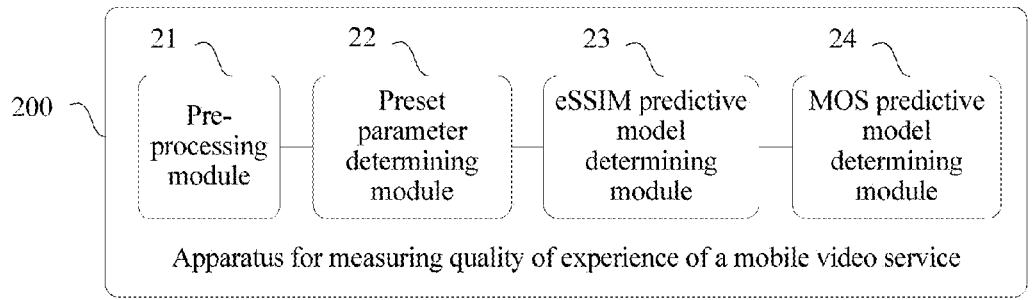
FIG. 11 is a schematic structural diagram of Embodiment 2 of an apparatus for measuring QoE of a mobile video service according to the present disclosure.

FIG. 11 is a schematic structural diagram of Embodiment 2 of an apparatus for measuring QoE of a mobile video service according to the present disclosure. The apparatus for measuring QoE of a mobile video service according to this embodiment is an apparatus embodiment corresponding to the embodiment in FIG. 9 of the present disclosure, and a specific implementation process is not described herein. Specifically, an apparatus 200 for measuring QoE of a mobile video service according to this embodiment includes: a pre-processing module 21 configured to pre-process a SSIM of each segment of a sample video at each bit rate to obtain a dSSIM, where the dSSIM of each segment at each bit rate is a difference between an SSIM of the segment at the bit rate and an SSIM of the segment corresponding to a maximum bit rate in the same sample video; a preset parameter determining module 22 configured to determine, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM; an eSSIM predictive model determining module 23 configured to determine an eSSIM predictive model according to preset parameters of received videos and corresponding MOSs, where the preset parameters of received videos are obtained according to all sample videos; and a MOS predictive model 24 configured to determine an eMOS predictive model according to the eSSIM predictive model determined by the eSSIM predictive model determining module 23.

Further, the eSSIM predictive model determining module 23 is configured to perform linear fitting on the preset parameters of all the sample videos and the corresponding MOSs once to determine an eSSIM, where eSSIM=a×mean dSSIM+b×max dSSIM+c×min dSSIM+d×std dSSIM, and a, b, c, and d are a group of parameters that enable correlation between the eSSIM and the MOS to be the largest.

The MOS predictive model determining module 24 is specifically configured to perform linear fitting on the eSSIM determined by the eSSIM predictive model, and a corresponding MOS once to determine an eMOS, where eMOS=e×eSSIM+f.

Further, a=1.4, b=0, c=−0.3, d=−0.9, e=22, and f=3.7.

Figure 12:
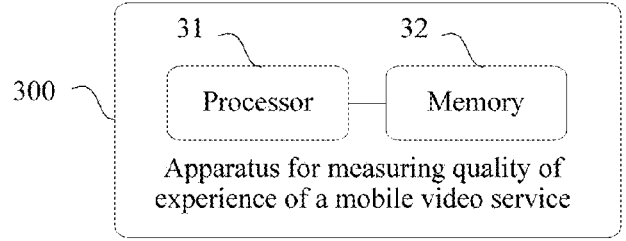
FIG. 12 is a schematic structural diagram of Embodiment 3 of an apparatus for measuring QoE of a mobile video service according to the present disclosure.

FIG. 12 is a schematic structural diagram of Embodiment 3 of an apparatus for measuring QoE of a mobile video service according to the present disclosure. The apparatus for measuring QoE of a mobile video service according to this embodiment is an apparatus embodiment corresponding to the embodiment in FIG. 1 of the present disclosure, and a specific implementation process is not described herein. Specifically, an apparatus 300 for measuring QoE of a mobile video service according to this embodiment specifically includes: a processor 31 and a memory 32, where the memory 32 stores an execution instruction; when the apparatus 300 for measuring QoE of a mobile video service runs, the processor 31 communicates with the memory 32, and the processor 31 executes the execution instruction to: pre-process a PSNR of each segment of a sample video at each bit rate to obtain a dPSNR, where the dPSNR of each segment at each bit rate is a difference between a PSNR of the segment at the bit rate and a PSNR of the segment corresponding to a maximum bit rate in the same sample video; determine, for the same sample video according to the dPSNR of each segment at each bit rate, a preset parameter that is of a received video and is obtained according to the sample video, where the preset parameter includes a mean dPSNR, a maximum dPSNR, a minimum dPSNR, and a variance dPSNR; determine ePSNR predictive model according to preset parameters of received videos and corresponding MOSs, where the preset parameters of received videos are obtained according to all sample videos; and determine an eMOS predictive model according to the ePSNR predictive model.

Further, the processor 31 is further configured to execute the execution instruction to perform linear fitting on the preset parameters of all the sample videos and the corresponding MOSs once to determine an ePSNR, where ePSNR=a×mean dPSNR+b×max dPSNR+c×min dPSNR+d×std dPSNR, and a, b, c, and d are a group of parameters that enable correlation between the ePSNR and the MOS to be the largest; and perform linear fitting on the ePSNR determined according to the ePSNR predictive model, and a corresponding MOS once to determine an eMOS, where eMOS=e×ePSNR+f.

Further, a=1.3, b=0, c=−0.2, d=−0.6, e=0.34, and f=4.1.

Figure 13:
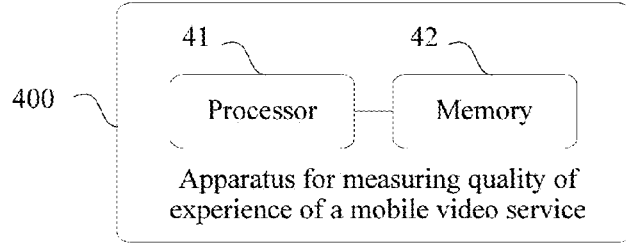
FIG. 13 is a schematic structural diagram of Embodiment 4 of an apparatus for measuring QoE of a mobile video service according to the present disclosure.

FIG. 13 is a schematic structural diagram of Embodiment 4 of an apparatus for measuring QoE of a mobile video service according to the present disclosure. The apparatus for measuring QoE of a mobile video service according to this embodiment is an apparatus embodiment corresponding to the embodiment in FIG. 9 of the present disclosure, and a specific implementation process is not described herein. Specifically, an apparatus 400 for measuring QoE of a mobile video service according to this embodiment includes: a processor 41 and a memory 42, where the memory 42 stores an execution instruction; when the apparatus for measuring QoE of a mobile video service runs, the processor 41 communicates with the memory 42, and the processor 41 executes the execution instruction to pre-process a SSIM of each segment of a sample video at each bit rate to obtain a dSSIM, where the dSSIM of each segment at each bit rate is a difference between an SSIM of the segment at the bit rate and an SSIM of the segment corresponding to a maximum bit rate in the same sample video; determine, for the same sample video according to the dSSIM of each segment at each bit rate, a preset parameter that is of a received video and is obtained according to the sample video, where the preset parameter includes a mean dSSIM, a maximum dSSIM, a minimum dSSIM, and a variance dSSIM; determine an eSSIM predictive model according to preset parameters of received videos and corresponding MOSs, where the preset parameters of received videos are obtained according to all sample videos; and determine an eMOS predictive model according to the eSSIM predictive model.

Further, the processor 41 is further configured to execute the execution instruction to perform linear fitting on the preset parameters of all the sample videos and the corresponding MOSs once to determine an eSSIM, where eSSIM=a×mean dSSIM+b×max dSSIM+c×min dSSIM+d×std dSSIM, and a, b, c, and d are a group of parameters that enable correlation between the eSSIM and the MOS to be the largest; and perform linear fitting on the eSSIM determined by the eSSIM predictive model, and a corresponding MOS once to determine an eMOS, where eMOS=e×eSSIM+f.

Further, a=1.4, b=0, c=−0.3, d=−0.9, e=22, and f=3.7.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for measuring quality of experience (QoE) of a mobile video service, the method comprising:
   pre-processing, with a processor coupled to a memory storing instructions, a peak signal-to-noise ratio (PSNR) of each segment of a sample video at each bit rate to obtain a differential PSNR (dPSNR) of each segment of the sample video at each bit rate, wherein the dPSNR of each segment is a difference between a PSNR of the segment at the bit rate and a PSNR of the segment corresponding to a maximum bit rate in the same sample video;
   determining, with the processor for the dPSNR of each segment, a preset parameter of a received video that is obtained according to the sample video, wherein the preset parameter comprises a mean dPSNR, a maximum (max) dPSNR, a minimum (min) dPSNR, and a variance (std) dPSNR;
   determining, with the processor, an enhanced PSNR (ePSNR) predictive model according to corresponding mean opinion scores (MOSs) and by linear fitting on the preset parameters, wherein ePSNR=a×mean dPSNR+b×max dPSNR+c×min dPSNR+d×std dPSNR, and wherein a, b, c, and d are parameters that enable correlation between the ePSNR and the MOS to be the largest; and
   determining, with the processor, an enhanced MOS (eMOS) predictive model by linear fitting on the determined ePSNR and the corresponding MOS, wherein eMOS=e×ePSNR+f, wherein each of a, b, c, d, e are non-zero at a same instant, and wherein each of a, b, c, d, e are finite.

2. The method according to claim 1, wherein a=1.3, b=0, c=−0.2, d=−0.6, e=0.34, and f=4.1.

3. A method for measuring quality of experience (QoE) of a mobile video service, comprising:
   pre-processing, with a processor, a structural similarity index measurement (SSIM) of each segment of a sample video at each bit rate to obtain a differential SSIM (dSSIM) of each segment of the sample video at each bit rate, wherein the dSSIM of each segment is a difference between an SSIM of the segment at the bit rate and an SSIM of the segment corresponding to a maximum bit rate in the same sample video;
   determining, with the processor for the dSSIM of each segment, a preset parameter of a received video that is obtained according to the sample video, wherein the preset parameter comprises a mean dSSIM, a maximum (max) dSSIM, a minimum (min) dSSIM, and a variance (std) dSSIM;

determining, with the processor, an enhanced SSIM (eSSIM) predictive model according to corresponding mean opinion scores (MOSs) and by linear fitting on the preset parameters, wherein eSSIM=a×mean dSSIM+b×max dSSIM+c×min dSSIM+d×std dSSIM, and wherein a, b, c, and d are parameters that enable correlation between the eSSIM and the MOS to be the largest; and determining, with the processor, an enhanced MOS (eMOS) predictive model by linear fitting on the determined eSSIM according to the eSSIM predictive model and the corresponding MOS to determine an eMOS, wherein eMOS=e×eSSIM+f, wherein each of a, b, c, d, e, and f are non-zero at a same instant, and wherein each of a, b, c, d, e, and f are finite.

4. The method according to claim 3, wherein a=1.4, b=0, c=−0.3, d=−0.9, e=22, and f=3.7.

5. An apparatus for measuring quality of experience (QoE) of a mobile video service, the apparatus comprising:
a memory comprising instructions; and
a processor coupled to the memory, wherein the instructions cause the processor to be configured to:
pre-process a peak signal-to-noise ratio (PSNR) of each segment of a sample video at each bit rate to obtain a differential PSNR (dPSNR) of the each segment sample video at each bit rate, wherein the dPSNR of each segment is a difference between a PSNR of the segment at the bit rate and a PSNR of the segment corresponding to a maximum bit rate in the same sample video;
determine, for the dPSNR of each segment, a preset parameter of a received video that is obtained according to the sample video, wherein the preset parameter comprises a mean dPSNR, a maximum (max) dPSNR, a minimum (min) dPSNR, and a variance (std) dPSNR;
determine an enhanced PSNR (ePSNR) predictive model according to a linear fitting on the preset parameters and corresponding mean opinion scores (MOSs), wherein ePSNR=a×mean dPSNR+b×max dPSNR+c×min dPSNR+d×std dPSNR, and wherein a, b, c, and d are parameters that enable correlation between the ePSNR and the MOS to be the largest; and
determine an enhanced MOS (eMOS) predictive model by linear fitting on the determined ePSNR according to the ePSNR predictive model and the corresponding MOS to determine an eMOS, wherein eMOS=e×ePSNR+f, wherein each of a, b, c, d, e, and f are non-zero at a same instant, and wherein each of a, b, c, d, e, and f are finite.

6. The apparatus according to claim 5, wherein a=1.3, b=0, c=−0.2, d=−0.6, e=0.34, and f=4.1.

7. An apparatus for measuring quality of experience (QoE) of a mobile video service, the apparatus comprising:
a memory comprising instructions; and
a processor coupled to the memory, wherein the instructions cause the processor to be configured to:
pre-process a structural similarity index measurement (SSIM) of each segment of a sample video at each bit rate to obtain a differential structural similarity index measurement (dSSIM) of each segment of the sample video at each bit rate, wherein the dSSIM of each segment is a difference between an SSIM of the segment at the bit rate and an SSIM of the segment corresponding to a maximum bit rate in the same sample video;
determine, for the dSSIM of each segment, a preset parameter of a received video that is obtained according to the sample video, wherein the preset parameter comprises a mean dSSIM, a maximum (max) dSSIM, a minimum (min) dSSIM, and a variance (std) dSSIM;
determine an enhanced SSIM (eSSIM) predictive model according to corresponding mean opinion scores (MOSs) and by linear fitting on the preset parameters, wherein eSSIM=a×mean dSSIM+b×max dSSIM+c×min dSSIM+d×std dSSIM, and wherein a, b, c, and d are parameters that enable correlation between the eSSIM and the MOS to be the largest; and
determine an enhanced MOS (eMOS) predictive model by linear fitting on the determined eSSIM and the corresponding MOS to determine an eMOS, wherein eMOS=e×eSSIM+f, and wherein each of a, b, c, d, e, and f are non-zero at a same instant, and wherein each of a, b, c, d, e, and f are finite.

8. The apparatus according to claim 7, wherein a=1.4, b=0, c=−0.3, d=−0.9, e=22, and f=3.7.

9. The method according to claim 1, further comprising calculating each of the mean dPSNR, the max dPSNR, the min dPSNR, and the std dPSNR using playing history of the sample video at a plurality of bit rates.

10. The method according to claim 3, further comprising calculating each of the mean dSSIM, the max dSSIM, the min dSSIM, and the std dSSIM using playing history of the sample video at a plurality of bit rates.

11. The apparatus according to claim 5, wherein each of the mean dPSNR, the max dPSNR, the min dPSNR, and the std dPSNR includes playing history of the sample video at a plurality of bit rates.

12. The apparatus according to claim 7, wherein each of the mean dSSIM, the max dSSIM, the min dSSIM, and the std dSSIM includes playing history of the sample video at a plurality of bit rates.

* * * * *